Oct. 6, 1925.

E. LEE

HEADLIGHT

Filed April 25, 1924

Elling Lee
INVENTOR
BY Victor J. Evans
ATTORNEY

WITNESS:
R. Q. Thomas

Oct. 6, 1925.
E. LEE
HEADLIGHT
Filed April 25, 1924    2 Sheets-Sheet 2
1,555,995
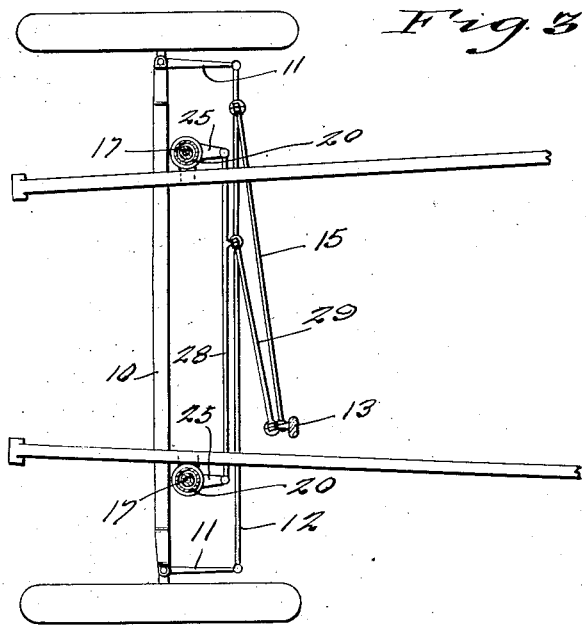
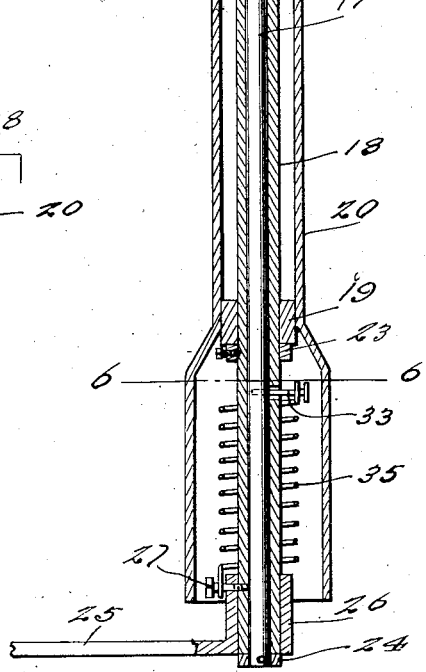
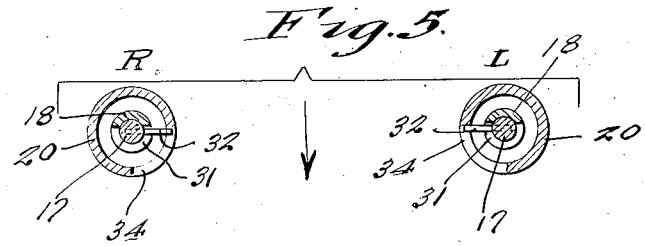
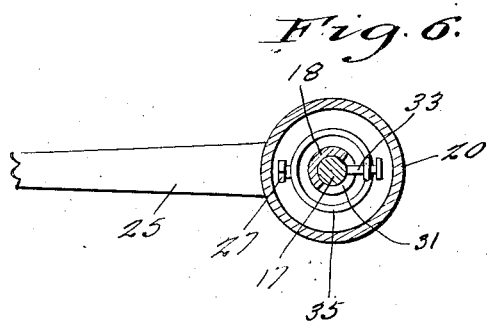
Elling Lee INVENTOR
BY Victor J. Evans
ATTORNEY
WITNESS:

Patented Oct. 6, 1925.

1,555,995

UNITED STATES PATENT OFFICE.

ELLING LEE, OF CARSTAIRS, ALBERTA, CANADA.

HEADLIGHT.

Application filed April 25, 1924. Serial No. 709,042.

*To all whom it may concern:*

Be it known that I, ELLING LEE, a subject of the King of Norway, residing at Carstairs, in the Province of Alberta and Dominion of Canada, have invented new and useful Improvements in Headlights, of which the following is a specification.

This invention relates to dirigible headlights for automobiles and has for an object the provision of means for mounting and connecting the headlights of an automobile whereby the rays of light will be projected in the direction in which the automobile is travelling.

Another object of the invention is the provision of means controlled by the operation of the steering mechanism of the automobile, whereby one of the lamps will be horizontally moved to project its rays in the direction in which the automobile is turning, while the rays of light from the other lamp will be directed straight ahead so that the roadway will be lighted both in the direction in which the vehicle is pointed and the direction of travel of the steering wheels, the particular lamp which is moved depending upon the particular direction in which the vehicle is steered.

Another object of the invention is the provision of means of the above character which is simple in construction, reliable in operation and which may be attached to an automobile already in make.

With the above and other objects in view, the invention further includes the following novel features and details of construction, to be hereinafter more fully described, illustrated in the accompanying drawings and pointed out in the appended claim.

In the drawings:—

Figure 3 is a fragmentary horizontal section showing the front portion of the chassis of an automobile with the invention applied.

Figure 4 is an enlarged vertical sectional view showing the manner of mounting the lamp posts.

Figure 5 is an enlarged detail horizontal section through the lamp posts and their mounting means.

Figure 6 is an enlarged horizontal section through one of the posts, the section being taken substantially on the line 6—6 of Figure 4.

Figure 1:
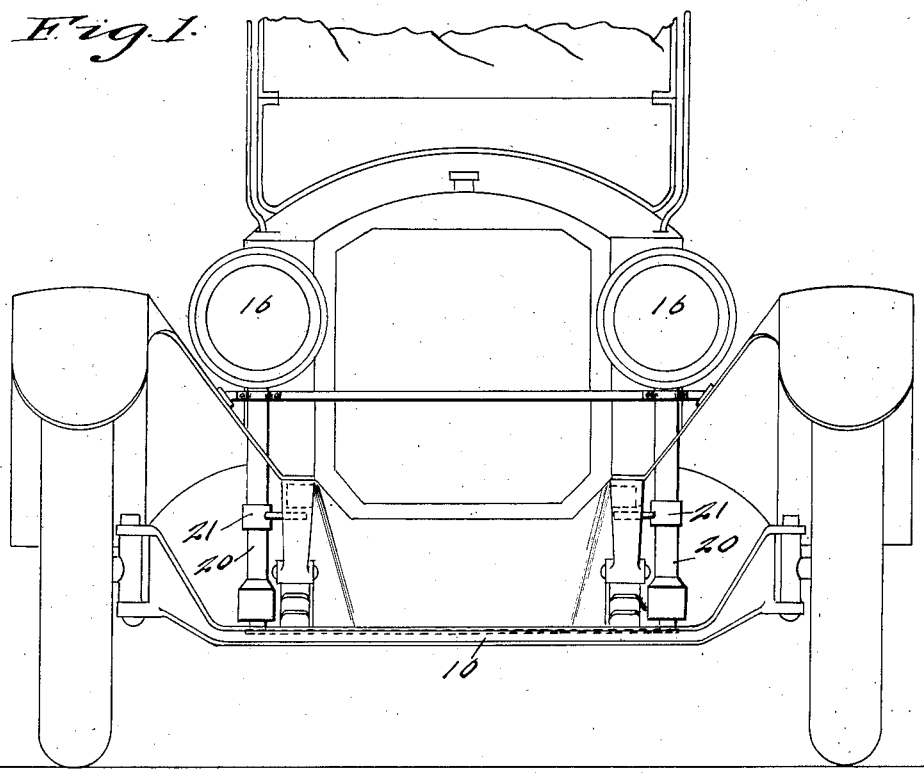
Figure 1 is a front elevation of a portion of an automobile with the invention applied.

Referring to the drawings in detail wherein like characters of reference denote corresponding parts, the reference character 10 indicates the front axle of an automobile, 11 the steering knuckle arms and 12 the rod which connects these arms. The rod 12 is connected to an arm 13 which extends from the steering post 14, connection being effected by means of a rod 15, one end of which is connected to the rod 12 and the opposite end to the arm 13 by a ball and socket connection. All of the foregoing is of the usual type of steering mechanism and forms no part of the present invention.

In the lamp controlling mechanism which constitutes the present invention, the lamps 16 are mounted upon posts 17 and are horizontally movable. These posts 17 are mounted in bearing sleeves 18 and the latter are mounted in spaced bearings 19. The bearings 19 are carried by a tubular housing 20 which is supported upon the frame of the automobile by means of brackets 21, the lower ends of the housings 20 being open while their upper ends are closed by a disk 22. The sleeves 18 are held within the bearings 19 by means of adjustable thrust collars 23, while longitudinal movement of the posts 17 within the sleeves 18 is prevented by means of adjustable collars 24.

Figure 2:
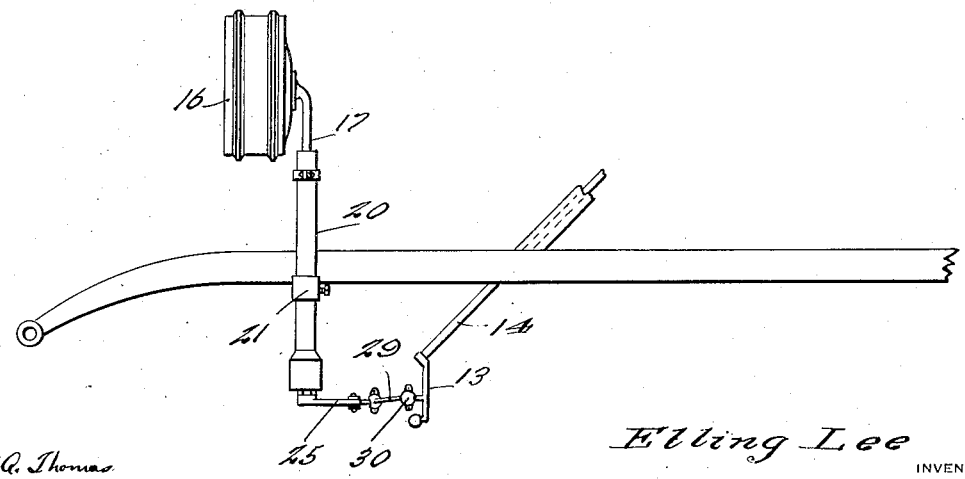
Figure 2 is a fragmentary elevation.

Secured to each of the sleeves 18 are arms 25, the latter being provided with sleeves 26 which surround the sleeves 18 and which are held against relative movement by set screws 27. The arms 25 are connected by means of a rod 28, and the latter is connected to the arm 13 by means of a rod 29. The connection between the rod 29 and the arm 13 is preferably in the form of a ball and socket connection as shown at 30 in Figure 2.

Extending from the posts 17 through slots 31 provided in the sleeves 18 are upper and lower pins 32 and 33 respectively, the first mentioned pin also extending into a slot 34 provided in the housing 20. These slots 31 and 34 permit of a limited movement of the pins 32 and 33.

The rods 17 are yieldingly connected to the arms 25 and for this purpose there are provided springs 35 having one of their ends connected to the pins 33 and their opposite ends to the set screws 27, so that rotary movement of the rods 17 in one direction will tension the springs 35.

Assuming that it is desired to turn the automobile to the right, operation of the steering mechanism for this purpose will move the rod 28 and impart simultaneous horizontal rotary movement to the arms 25. This will impart rotary movement to the sleeves 18. Now, by reference to Figure 5 of the drawings wherein R indicates the mounting for the right hand lamp and L the mounting for the left hand lamp, it will be seen that when the vehicle is travelling in the direction of the arrow in the said figure, rotation of the sleeve 18 of the right hand lamp will cause the said sleeve to engage the pin 32 to rotate the shaft 17 and move the lamp pivotally to the right, the sleeve 18 of the left hand lamp being free to rotate without engaging its pin 32, the shoulder at the end of the slot 34 serving to resist any tendency of this post to move in a clockwise direction. The right hand lamp will thus be moved in the direction of movement of the steering wheels while the left hand lamp will be directed on a line with the body of the automobile. Movement of the sleeve of the right hand lamp will tension its spring 35 so that when the steering wheels are again straightened out, this spring will move the right hand lamp to its normal straight ahead position. Movement of the steering mechanism to the left will cause the left hand lamp to be moved horizontally in the manner just described while the right hand lamp will remain straight ahead.

It is apparent that the lamp controlling means may be so arranged that movement of the steering gear to the right will move the left hand lamp horizontally and leave the right hand lamp straight ahead and vice versa. This is desirable in cases where the lamps are positioned with respect to the front fenders as to interrupt the rays of light should the right hand lamp be operated by a right hand turn and the left hand lamp operated by a left hand turn.

The invention is susceptible of various minor changes in its details of construction, for example, the arms 25 may be connected to the steering post 14 by means of gearing or a rock shaft connection may be provided.

Having described the invention what is claimed is:—

The combination with an automobile, of a pair of posts, lamps mounted upon said posts, a housing surrounding and spaced from each post, spaced bearings within the housing, post receiving sleeves rotatable with respect to said posts and engaging the spaced bearings, arms connected to the sleeves, means operatively connecting the arms and steering mechanism of the automobile to move the arms, means connecting the posts and sleeves to rotate one of the posts when the sleeves are rotated in an opposite direction and springs connecting the posts and arms for returning the posts to normal position.

In testimony whereof I affix my signature.

ELLING LEE.